United States Patent
Batdorff

(10) Patent No.: US 7,559,392 B2
(45) Date of Patent: Jul. 14, 2009

(54) ELECTRIC CABLE ORGANIZER FOR A BATTERY BOX IN AN AUTOMOTIVE VEHICLE

(75) Inventor: Jonathan D. Batdorff, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 98 days.

(21) Appl. No.: 11/873,026

(22) Filed: Oct. 16, 2007

(65) Prior Publication Data

US 2009/0095550 A1 Apr. 16, 2009

(51) Int. Cl.
*B60R 16/04* (2006.01)
(52) U.S. Cl. .......................... 180/68.5; 429/9; 429/100
(58) Field of Classification Search ............... 180/68.5; 429/9, 96, 99, 100, 121
See application file for complete search history.

(56) References Cited

U.S. PATENT DOCUMENTS

| | | | | |
|---|---|---|---|---|
| 4,225,655 A | * | 9/1980 | Pesce | 429/100 |
| 4,983,473 A | * | 1/1991 | Smith | 429/48 |
| 5,378,555 A | * | 1/1995 | Waters et al. | 429/97 |
| 5,522,734 A | * | 6/1996 | Goertzen | 439/500 |
| 5,709,280 A | * | 1/1998 | Beckley et al. | 180/68.5 |
| 5,941,483 A | | 8/1999 | Baginski | |
| 7,007,900 B2 | | 3/2006 | Goodwin et al. | |
| 7,301,303 B1 | * | 11/2007 | Hulden | 320/105 |

\* cited by examiner

*Primary Examiner*—Christopher P Ellis
*Assistant Examiner*—John D Walters
(74) *Attorney, Agent, or Firm*—Jeffrey P. Calfa; Mark C. Bach

(57) ABSTRACT

A battery cable organizer (22) is associated with a battery box (10) to route battery cables (18, 20) coming out of the box and secure them to the organizer using cable ties (44).

15 Claims, 1 Drawing Sheet

ELECTRIC CABLE ORGANIZER FOR A BATTERY BOX IN AN AUTOMOTIVE VEHICLE

FIELD OF THE INVENTION

This invention relates generally to electrical systems of automotive vehicles and particularly to an organizer for electric cables that come out of a battery box to feed the electrical system, such as in a large vehicle like a heavy truck.

BACKGROUND OF THE INVENTION

A typical heavy truck has a battery box that is supported on the side of a chassis frame rail by some form of bracket mounting structure. The battery box houses a bank of one or more D.C. storage batteries and has a removable cover that, when removed, provides access to the batteries. Some type of opening is provided in a wall of the battery box through which the electric battery cables that are connected to the battery are routed out of the box so that they can feed the electrical system of the vehicle.

Because battery cables are heavy gauge insulated wires (4/0 is a common gauge), they are more difficult to route and secure in place than lighter gauge wires. In certain vehicles whose electrical equipment can draw large amounts of current from the storage batteries in the battery bank, the feeds comprise one or more insulated cable pairs running in parallel from the positive electrical terminal of the battery bank and two or more insulated cable pairs running in parallel from the negative electrical terminal of the battery bank. Such parallel cables pairs make the task of routing the feeds even more challenging.

Orderly routing and secure retention of the battery cables are particularly important because the cables are typically unprotected by any circuit protection device. If a poorly secured or poorly routed "hot" cable repeatedly rubs against a metal part or is exposed to being chafed or cut, the insulation may wear or open to an extent that causes the conductor to become exposed and short to ground, instantaneously releasing an enormous amount of electrical energy, usually with undesirable consequences.

For various reasons, such as economy of scale, reduced in-plant inventory of different parts, and the like, the prevailing manufacture of automotive vehicles calls for the use common parts wherever possible. Different vehicles that have different requirements for the number of batteries in a battery bank and/or the size and number of battery cables may therefore use a common battery box even if fewer batteries are present inside the box and different numbers and/or sizes of battery cables are required.

It is known to use cable organizers in association with battery boxes to organize the routing of battery cables out of the boxes. A cable organizer may have a shape and particular constructional features for locating particular battery cables. While such organizers may be suitable for a specific number of specifically sized cables, they may be not as well suited for other cable sizes and/or additional cables. An attempt to use such an organizer for battery cables other than the particular cable size and number for which it was designed may lead to less than the best routing and retention of the cables. For example, cables may have to be bunched and/or crossed and/or forced into place. Excess cable length may place segments of the length in locations where they are exposed to abrasion and/or being cut.

Because the storage batteries and/or battery cables are apt to need service and/or replacement during the life of a motor vehicle, it is desirable that a cable organizer have a construction that doesn't complicate such tasks and that can provide assurance that cables can be quickly removed from the organizer and quickly and securely re-installed.

SUMMARY OF THE INVENTION

The present invention relates to a new and improved battery cable organizer that is associated with a battery box that houses a battery bank of one or more D.C. storage batteries to secure battery cables in a desired routing out of the box.

One general aspect of the invention relates to an automotive vehicle comprising a walled battery box that houses a bank of one or more D.C. storage batteries and that has an opening through which at least one electric cable from the battery bank comes out of the box to feed an electrical system of the vehicle.

The opening is defined by a first wall having a surface on which a segment of the length of a battery cable is disposed as the cable passes through the opening and a second wall having surface portions that are generally upright relative to the surface of the first wall, that are separated by a recess in a direction parallel with the direction of the cable segment, and that are convex toward the cable segment.

A tie ties the cable to the first wall and in doing so passes through a through-hole in a portion of the first wall that extends into the recess.

A further general aspect of the invention relates to the organizer itself.

The organizer comprises a first wall comprising a surface on which electric cables can be disposed, a second wall adjoining one lengthwise end of the first wall and comprising surface portions that are generally upright relative to the surface of the first wall and that are separated from each other by a recess in a direction parallel with width of the first wall, and a third wall adjoining an opposite lengthwise end of the first wall and comprising surface portions that are generally upright relative to the surface of the first wall and that are separated from each other by a recess in a direction parallel with the width of the first wall.

First and second through-holes are spaced apart from each other in the first wall. The first through-hole is disposed in a portion of the first wall that extends into the recess of the second wall, and the second through-hole is disposed in a portion of the first wall that extends into the recess of the third wall.

One or more additional through-holes in the first wall are between and spaced from the first and second through-holes.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
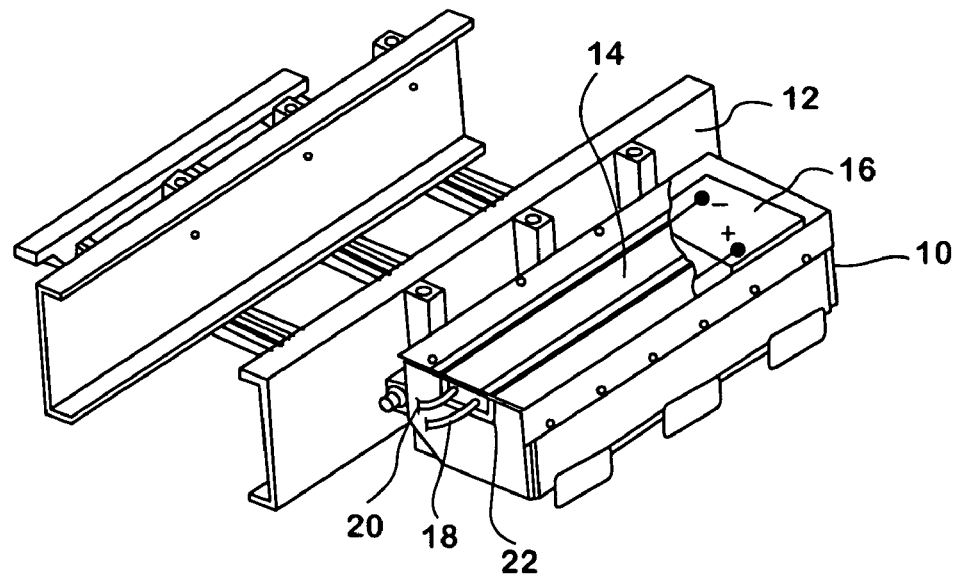
FIG. 1 is a perspective view illustrating a battery box that is hung on a frame side rail of a heavy truck and in accordance with principles of the present invention includes a battery cable organizer.

FIG. 1 shows a battery box 10 that has been hung on a side of a truck frame rail 12 that runs lengthwise of the truck. Battery box 10 has a bottom wall that forms a battery tray supporting a bank of one or more D.C. storage batteries and sides that surround the battery bank. A portion of a cover 14 that fits onto the open top of the box sides is broken away to show one of the batteries 16.

One insulated electrical cable 18 extends from a positive electrical terminal of the battery bank and a second cable 20 from the negative electrical terminal. In the example of the preferred embodiment shown here, each cable comprises two parallel lengths of insulated cable, such as two lengths of 4/0 gauge insulated cable, although on the drawing scale of FIG. 1, it appears that each cable comprises only a single length of cable.

At the near end of battery box 10, a cable organizer 22 is mounted on box 10 to route the cables as they exit the interior of the box and to enable them to be properly secured. Further detail of organizer 22 will be seen in FIG. 2 and explained in reference to that Figure.

Organizer 22 comprises a first wall 24, a second wall 26, and a third wall 28. Wall 24 is flat and has a uniform thickness. Walls 26 and 28 perpendicularly adjoin wall 24 at opposite lengthwise ends of the latter. The general U-shape of the three walls forms a saddle within which the cables are disposed.

Side-by-side segments 20A, 20B of the respective cables forming cable 20 are disposed side-by-side on the top surface of wall 24 proximately adjacent wall 26. Although not shown in the interest of drawing clarity, side-by-side segments of the respective cables forming cable 18 are disposed side-by-side on the top surface of wall 24 proximately adjacent wall 28.

Wall 26 comprises surface portions 26A, 26B that are generally upright relative to the flat top surface of wall 24 (specifically they are perpendicular to the top surface of wall 24). Surface portions 26A, 26B are separated from each other in a direction parallel with the width of wall 24 by a recess 26C formed in wall 26.

Similarly, wall 28 comprises surface portions 28A, 28B that are also perpendicular to the top surface of wall 24, with surface portions 28A, 28B being separated from each other in a direction parallel with the width of wall 24 by a recess 28C formed in wall 28. Hence, each wall 26, 28 is essentially a mirror image of the other.

Four rectangular through-holes 30, 32, 34, and 36 are arranged in a straight line, and spaced evenly apart from each other in succession in wall 24. Through-hole 30 is disposed in a portion of wall 24 that extends into recess 26C while through-holes 36 is disposed in a portion of wall 24 that extends into recess 28C.

The near end of the battery box sidewall comprises a rectangular-shaped notch 38 in a margin of its top edge. The outer upright surface of wall 26 opposite the convex surface portions 26A, 26B comprises a straight upright groove 40 running the full height of the wall. The outer upright surface of wall 28 opposite the convex surface portions 28A, 28B comprises a straight upright groove 42 running the full height of the wall. The grooves are mutually parallel and lie in a common imaginary plane across the long dimension (length) of organizer 22.

With cover 14 not placed on the box, organizer 22 can be placed above the top edge of the box sidewall with grooves 40, 42 aligned with the sides of notch 38, and the organizer then slid downward into the notch until wall 24 bottoms out on the lower edge of the notch, at which time the tops of walls 26, 28 are essentially flush with the top edge of the box so as not to interfere with placement of cover 14 on the box.

The organizer may be fastened to the box or left unfastened. It may be placed in the notch with one or both battery cables secured to it, or it may be placed in the notch before any battery cable is fastened to it.

Figure 2:
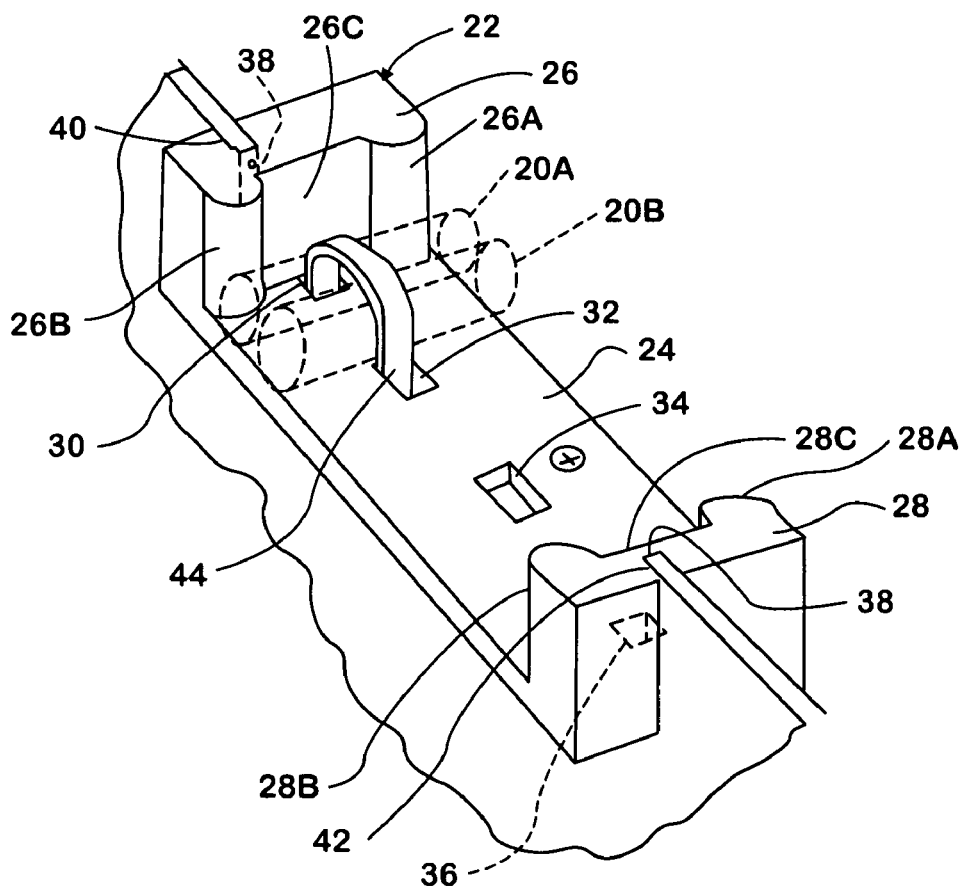
FIG. 2 is an enlarged perspective view of the organizer by itself mounted on the battery box with cables shown in phantom.

Fastening of the battery cables is accomplished by using ties, such as a tie 44 shown in FIG. 2 securing the two cable segments 20A, 20B on wall 24 proximately adjacent convex surface portions 26A, 26B. An example of tie 44 is a synthetic cable locking tie that has a pointed end with a series of serrations extending along the tie from that end toward an opposite end that contains a ratchet lock. The pointed end is threaded through one of the through-holes 30, 32 in one direction, such as upwardly from beneath wall 24, then over and across the side-by-side cable segments, and then downwardly through the other through-hole 30, 32 and into the ratchet lock. The pointed end is pulled through the ratchet lock to draw the tie tight against the cable segments keeping them side-by-side on the top surface of wall 24.

Through-holes 30, 32 are sized and located to enable the tie to provide a snug and secure attachment of the cable segments to the organizer. That type of attachment is important for proper control of the cable routing. The through-holes enable the act of tightening the cable tie to exert tension on the middle of the cable segments 20A, 20B. In conjunction with the presence of convex surface portions 26A, 26B at opposite ends on one side of the cable pair, the tightened tie tends to keep the cable pair straight as the segments pass through the organizer.

Removal of the tie can be done by cutting it if its ratchet lock is not releasable.

In a similar way the other polarity cables that are not shown in FIG. 2 can be secured to the organizer using a second tie that is threaded through holes 34 and 36.

The spacing between through-holes 32, 34 allows yet a third pair of cables to pass through the organizer between that pair of through-holes and to be secured by a tie passing through the two through-holes.

Organizer 22 is fabricated as a synthetic non-conductive part by conventional molding techniques. Alternately, the structure of the organizer could be incorporated into the battery box itself in any suitable orientation when at least a side wall of the battery box is a molded synthetic part.

The convexly rounded surface portions 26A, 26B, 28A, and 28B do not present sharp edges to the sides of the routed cables. Each pair of through-holes 32, 34 is dimensionally related to the location of the respective pair of convex surface portions, 26A-26B, 28A-28B to prevent a third wire of the same wire gauge as that of either cable segment 20A, 20B from being disposed on the top surface of wall 24 and tied to that wall by a tie. In that way, risk of bundling and/or crossing of wires is virtually eliminated.

While a presently preferred embodiment of the invention has been illustrated and described, it should be appreciated that principles of the invention are applicable to all embodiments that fall within the scope of the following claims.

What is claimed is:

1. An automotive vehicle comprising:
   a) a walled battery box that houses a bank of one or more D.C. storage batteries and that has an opening through which at least one electric cable from the battery bank comes out of the box to feed an electrical system of the vehicle, b) the opening being defined by
   i) a first wall having a surface on which a segment of the length of a battery cable is disposed as the cable passes through the opening, and
   ii) a second wall having surface portions that are generally upright relative to the surface of the first wall, that are separated by a recess in a direction parallel with the direction of the cable segment, and that are convex toward the cable segment, c) and further comprising a tie that ties the cable to the first wall and in doing so passes through a through-hole in a portion of the first wall that extends into the recess.

2. An automotive vehicle as set forth in claim 1 in which the first wall comprises a second through-hole that is disposed on an opposite side of the cable segment from the through-hole in the portion of the first wall that extends into the recess, and the tie passes through the second through-hole in full encirclement of the cable segment and a portion of the first wall between the two through-holes.

3. An automotive vehicle as set forth in claim 2 in which the tie is outside the battery box.

4. An automotive vehicle as set forth in claim 3 including a second cable having a segment of its length side-by-side with the first-mentioned cable segment on the surface of the first wall, and in which the second through-hole is dimensionally related to the location of the convex surface portions of the second wall to prevent a third wire of the same wire gauge as that of either the first-mentioned or second cable from being disposed on the surface of the first wall and tied to the first wall by the tie.

5. An automotive vehicle as set forth in claim 1 further comprising third and fourth cables having respective segments of their lengths disposed side-by-side on the surface of the first wall as they pass through the opening, and a third wall opposite the second wall and having surface portions that are generally upright relative to the surface of the first wall, that are separated by a recess in a direction parallel with the direction of the segments of the third and fourth cables, and that are convex toward the third and fourth cable segments, and further comprising a tie that ties the third and fourth cable segments to the first wall and in doing so passes through a third through-hole in the first wall that is located in a portion of the first wall that extends into the recess of the third wall.

6. An automotive vehicle as set forth in claim 5 in which the first wall comprises a fourth through-hole that is disposed on an opposite side of the third and fourth cable segments from the third through-hole, and in which the tie passes through the fourth through-hole in full encirclement of the third and fourth cable segments and a portion of the first wall between the third and fourth through-holes.

7. An automotive vehicle as set forth in claim 6 in which the first-mentioned and second cables are connected to the same electrical polarity of the battery bank, and the third and fourth cables are connected to the opposite polarity of the battery bank.

8. An automotive vehicle as set forth in claim 5 in which the first, second, and third walls are contained in a separate synthetic part that fits to a through-opening in a wall of the battery box.

9. An automotive vehicle as set forth in claim 8 in which the through-opening in a wall of the battery box comprises a notch in an edge margin of the battery box wall, the separate synthetic part comprises mutually parallel grooves in surfaces of the second and third walls that are opposite the convex surface portions of the second and third walls, and side edge margins of the notch fit in the grooves.

10. An automotive vehicle as set forth in claim 9 in which the notch is in a top edge margin of the battery box wall, the separate synthetic part is substantially flush with the top edge margin of the battery box, and the battery box comprises a cover that is clear of the cable segments as they pass out of the box.

11. An organizer for electric cables coming from a bank of one or more D.C. storage batteries in a battery box, the organizer comprising:
   a) a first wall comprising a surface on which electric cables can be disposed;
   b) a second wall adjoining one lengthwise end of the first wall and comprising surface portions that are generally upright relative to the surface of the first wall and that are separated from each other by a recess in a direction parallel with width of the first wall;
   c) a third wall adjoining an opposite lengthwise end of the first wall and comprising surface portions that are generally upright relative to the surface of the first wall and that are separated from each other by a recess in a direction parallel with the width of the first wall;
   d) first and second through-holes spaced apart from each other in the first wall, the first through-hole being disposed in a portion of the first wall that extends into the recess of the second wall, and the second through-hole being disposed in a portion of the first wall that extends into the recess of the third wall,
   e) and one or more additional through-holes in the first wall that are between and spaced from the first and second through-holes.

12. An organizer as set forth in claim 11 wherein the generally upright surface portions of each of the second and third walls are convex toward the opposite one of the second and third walls.

13. An organizer as set forth in claim 11 further including mutually parallel grooves in surfaces of the second and third walls that are opposite the convex surface portions of the second and third walls, the grooves running generally perpendicular to the surface of the first wall.

14. An organizer as set forth in claim 11 in which the one or more additional through-holes in the first wall that are between and spaced from the first and second through-holes comprise a third through-hole and a fourth through-hole.

15. An organizer as set forth in claim 14 in which the four through-holes are disposed to one side of an imaginary plane containing the grooves.

* * * * *